(12) United States Patent
Hashida et al.

(10) Patent No.: US 12,126,038 B2
(45) Date of Patent: Oct. 22, 2024

(54) ELECTRIFIED VEHICLE

(71) Applicants: TOYOTA JIDOSHA KABUSHIKI KAISHA, Aichi-ken (JP); SUBARU CORPORATION, Tokyo (JP)

(72) Inventors: Shigenori Hashida, Nisshin (JP); Takayuki Nakamura, Toyota (JP); Osamu Shimasaki, Nisshin (JP); Hyuga Atsumi, Nagoya (JP); Satoshi Ikeda, Tokyo (JP); Daisuke Suewaka, Tokyo (JP)

(73) Assignees: TOYOTA JIDOSHA KABUSHIKI KAISHA, Aichi-Ken (JP); SUBARU CORPORATION, Tokyo (JP)

( * ) Notice: Subject to any disclaimer, the term of this patent is extended or adjusted under 35 U.S.C. 154(b) by 450 days.

(21) Appl. No.: 17/712,196

(22) Filed: Apr. 4, 2022

(65) Prior Publication Data

US 2022/0320666 A1    Oct. 6, 2022

(30) Foreign Application Priority Data

Apr. 6, 2021   (JP) .................................. 2021-064928

(51) Int. Cl.
  *H01M 50/242*    (2021.01)
  *B60K 1/04*    (2019.01)
  *B62D 21/11*    (2006.01)

(52) U.S. Cl.
  CPC ............ *H01M 50/242* (2021.01); *B60K 1/04* (2013.01); *B60K 2001/0438* (2013.01); *B62D 21/11* (2013.01); *H01M 2220/20* (2013.01)

(58) Field of Classification Search
  CPC .. B60K 1/04; B60K 2001/0438; B62D 21/15; B62D 21/152
  See application file for complete search history.

(56) References Cited

U.S. PATENT DOCUMENTS

| | | | |
|---|---|---|---|
| 9,937,781 B1* | 4/2018 | Bryer | B62D 35/02 |
| 2019/0002026 A1 | 1/2019 | Ayukawa | |
| 2019/0016388 A1* | 1/2019 | Shimizu | B60K 1/04 |
| 2019/0023324 A1* | 1/2019 | Sekiya | B62D 25/20 |
| 2019/0061830 A1* | 2/2019 | Fujisawa | B62D 25/08 |
| 2019/0135100 A1* | 5/2019 | Lange | B60K 1/04 |

(Continued)

FOREIGN PATENT DOCUMENTS

| | | |
|---|---|---|
| JP | 2015-217899 A | 12/2015 |
| JP | 2019-10999 A | 1/2019 |

(Continued)

*Primary Examiner* — Brian L Swenson
(74) *Attorney, Agent, or Firm* — HAUPTMAN HAM, LLP

(57) ABSTRACT

An electrified vehicle includes a floor panel, a battery case, a frame that that supports a suspension, and a brace. The brace is fixed to the frame by a first fixing portion situated on a right side of the vehicle with respect to a middle line. The brace is fixed to the frame by a second fixing portion situated on a left side of the vehicle with respect to the middle line. The brace is fixed to the battery case by a third fixing portion situated on the right side of the vehicle with respect to the middle line. The brace is fixed to the battery case by a fourth fixing portion situated on the left side of the vehicle with respect to the middle line. The brace includes a first plate and a second plate which is fixed to the first plate and covers a recessed portion.

7 Claims, 9 Drawing Sheets

(56) References Cited

U.S. PATENT DOCUMENTS

| | | | |
|---|---|---|---|
| 2019/0275875 A1 | 9/2019 | Fukui | |
| 2019/0276093 A1* | 9/2019 | Tatsuwaki | B62D 25/2036 |
| 2020/0086926 A1 | 3/2020 | Hashida et al. | |
| 2022/0032758 A1* | 2/2022 | Kaneko | B62D 21/11 |
| 2022/0402551 A1* | 12/2022 | Hara | B62D 47/02 |

FOREIGN PATENT DOCUMENTS

| | | |
|---|---|---|
| JP | 2019-91605 A | 6/2019 |
| JP | 2019-156031 A | 9/2019 |
| JP | 2020-44911 A | 3/2020 |

\* cited by examiner

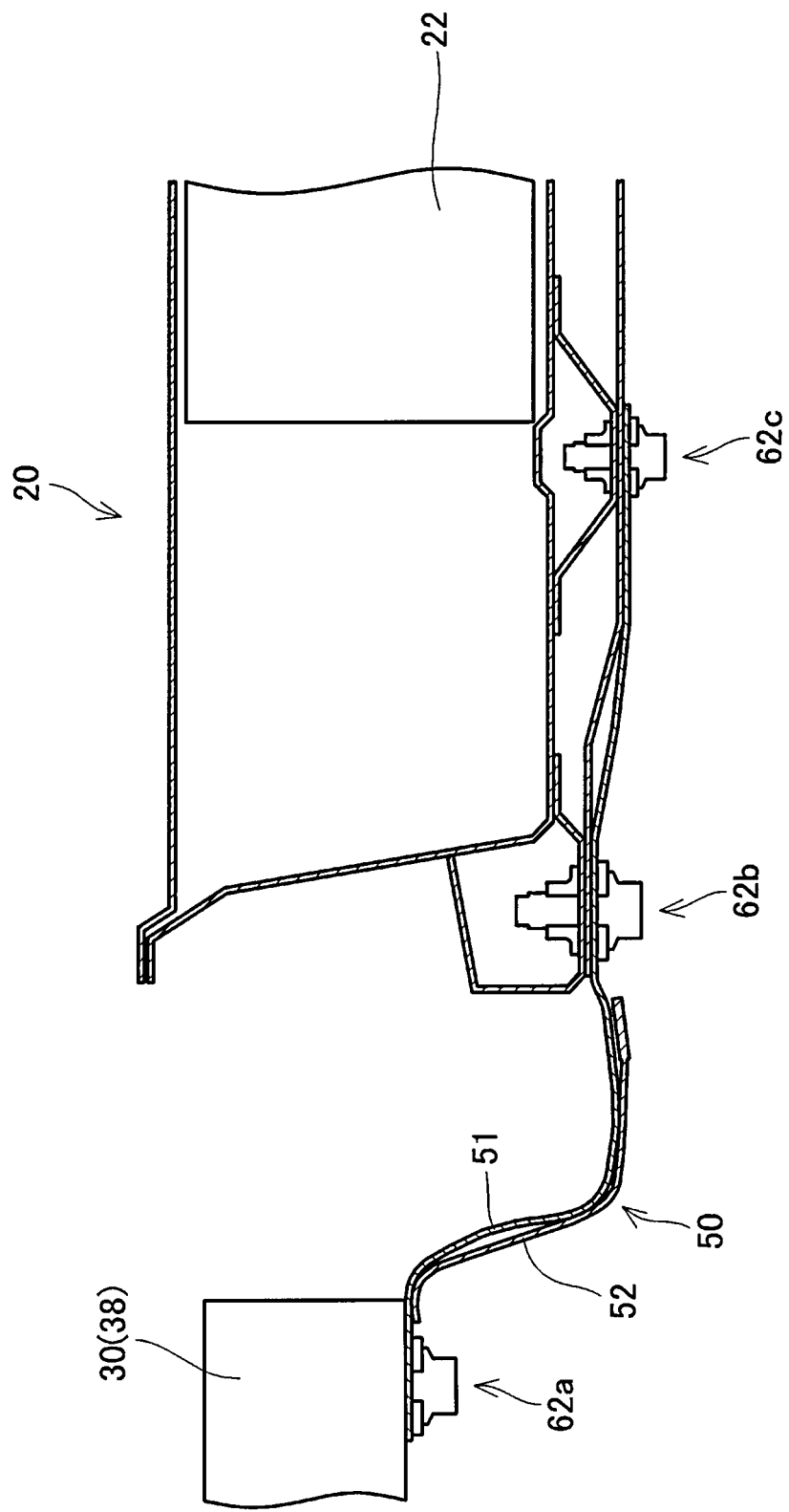

ELECTRIFIED VEHICLE

CROSS-REFERENCE TO RELATED APPLICATION

This application claims priority to Japanese Patent Application No. 2021-064928 filed on Apr. 6, 2021, incorporated herein by reference in its entirety.

BACKGROUND

1. Technical Field

The technology disclosed in the present specification relates to an electrified vehicle. Note that in the present specification, the term "electrified vehicle" means a vehicle that travels by using electric power stored in a battery. Electrified vehicles include hybrid electric vehicles that travel by using electricity and fuel.

2. Description of Related Art

An electrified vehicle disclosed in Japanese Unexamined Patent Application Publication No. 2019-010999 (JP 2019-010999 A) has a battery case that is disposed on a lower side of a floor panel. In this electrified vehicle, a frame supporting a front-side suspension (i.e., a suspension member) and the battery case are connected by two connecting members (i.e., suspension siderail rears). One connecting member is disposed to a right side of a middle in a vehicle-width direction. The other connecting member is disposed to a left side of the middle in the vehicle-width direction. According to this configuration, a load applied to a body when the vehicle encounters a collision can be conveyed to the battery case, and accordingly the load applied to the body can be reduced.

SUMMARY

In the vehicle according to JP 2019-010999 A, the right and left connecting members are separated. Accordingly, when the vehicle encounters a collision on either the right or left side, the load is not applied to the connecting member situated on the opposite side from the portion involved in the collision, and the load cannot be sufficiently conveyed to the battery case. For example, when the collision of the vehicle occurs at the right side thereof, a load is applied to the right-side portion of the battery case through the connecting member on the right side. However, in this case, the load is not readily applied to the connection member on the left side, and the load is not readily conveyed to the left side portion of the battery case. Thus, when the connecting member connecting the frame and the battery case is separated on the right and left, a problem occurs in which the battery case cannot properly bear the load when a collision occurs on one of the right and left sides. Note that while JP 2019-010999 A discloses connecting members connecting the battery case and the frame on a front side thereof, the same problem occurs regarding connecting members connecting the battery case and the frame on a rear side thereof.

In order to solve this problem, the frame and the battery case can be connected by a plate-shaped connecting member extending across both sides of the middle in the vehicle-width direction. According to this configuration, the load in a collision that is biased to one of the right and the left can be conveyed to both the right side portion and the left side portion of the battery case. However, when the frame and the battery case are connected by the plate-shaped connecting member, securing sufficient strength to serve as a connecting member is difficult. Accordingly, when the vehicle collides, the connecting member is readily deformed and the load is not readily conveyed to the battery case.

In the present specification, there is proposed a technology regrading a vehicle having a connecting member for connecting the frame and the battery case, in which sufficient strength is secured to serve as the connecting member, and a load at the time of a collision that is biased to the right or the left can be conveyed to both the right-side portion and the left-side portion of the battery case.

An aspect of the present disclosure relates to an electrified vehicle. The electrified vehicle includes a floor panel, a battery case, a frame and a brace. The battery case is disposed on a lower side of the floor panel, and accommodates a battery. The frame is disposed in a vehicle forward side or a vehicle rearward side of the battery case and supports a suspension. The brace intersects an imaginary middle line orthogonal to a vehicle-width direction of the electrified vehicle, and is fixed to the frame and the battery case. The brace is fixed to the frame by a first fixing portion situated on a right side of the electrified vehicle with respect to the middle line. The brace is fixed to the frame by a second fixing portion situated on a left side of the electrified vehicle with respect to the middle line. The brace is fixed to the battery case by a third fixing portion situated on the right side of the electrified vehicle with respect to the middle line. The brace is fixed to the battery case by a fourth fixing portion situated on the left side of the electrified vehicle with respect to the middle line. The brace includes a first plate member and a second plate member. The first plate member includes a first bead that is situated on the right side of the electrified vehicle with respect to the middle line and that extends in a front-rear direction, and a second bead that is located on the left side of the electrified vehicle with respect to the middle line and that extends in the front-rear direction. The second plate member is fixed to the first plate member, being stacked with the first plate member, and covers a first recessed portion configured of the first bead on a surface of the first plate member and a second recessed portion configured of the second bead on the surface of the first plate member.

In this electrified vehicle, a connecting member connecting a frame and a battery case is configured of a brace. The brace extends across both sides of a middle in a vehicle-width direction of the electrified vehicle and is connected to the frame and the battery case on each of the right and left sides of the middle. That is to say, the connecting member is configured of the brace connected from the right side to the left side of the vehicle. Accordingly, a load in a collision that is biased to one of the right and the left can be conveyed to both the right-side portion and the left-side portion of the battery case. The brace also includes a first plate member and a second plate member. The first plate member includes a first bead and a second bead extending in a front-rear direction, and the second plate member covers recessed portions configured by the beads. Accordingly, the brace is configured with a structure in which a tubular portion configured of the first bead and the second plate member, and a tubular portion configured of the second bead and the second plate member, extend in the front-rear direction. The brace is imparted with great strength according to this structure. Accordingly, the brace enables the load to be appropriately conveyed from the frame to the battery case.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 10 is a diagram illustrating deformation of the brace 50 at the time of a collision.

DETAILED DESCRIPTION OF EMBODIMENTS

Figure 1:
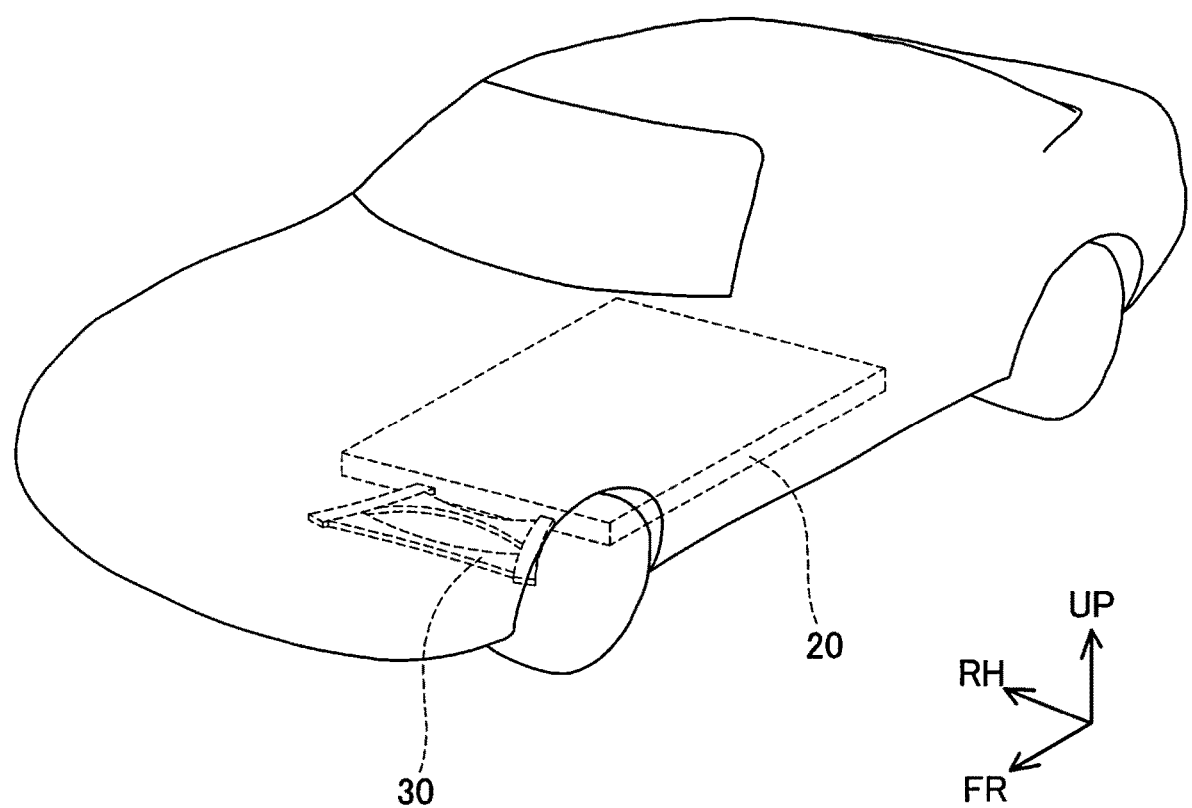
FIG. 1 is a perspective view of an electrified vehicle 10.

An example of an electrified vehicle disclosed in the present specification may further include a first bolt that fixes a brace to a frame at a first fixing portion, a second bolt that fixes the brace to the frame at a second fixing portion, a third bolt that fixes the brace to a battery case at a third fixing portion, and a fourth bolt that fixes the brace to the battery case at a fourth fixing portion.

According to this configuration, the brace can be removed from the frame and the battery case by removing the first bolt, the second bolt, the third bolt, and the fourth bolt. This improves ease of maintenance of the electrified vehicle.

In an example of the electrified vehicle disclosed in the present specification, the brace may be fixed to the battery case at a fifth fixing portion situated on a right side with respect to a middle and situated rearward of the third fixing portion, and the brace may be fixed to the battery case at a sixth fixing portion situated on a left side with respect to the middle and situated rearward of the fourth fixing portion.

According to this configuration, the brace reinforces a front portion of the battery case and suppresses deformation of the battery case.

In an example of the electrified vehicle disclosed in the present specification, a coolant pipe that extends in a vehicle-width direction may be provided within the battery case. The coolant pipe may be disposed in at least one of between the third fixing portion and the fifth fixing portion and between the fourth fixing portion and the sixth fixing portion, in plan view of the battery case from below.

According to this configuration, damage to the coolant pipe can be suppressed.

In an example of the electrified vehicle disclosed in the present specification, a first bead may extend from the first fixing portion to the third fixing portion, and a second bead may extend from the second fixing portion to the fourth fixing portion.

According to this configuration, the strength of the brace is further improved.

In an example of the electrified vehicle disclosed in the present specification, a first recessed portion and a second recessed portion may be provided on a lower face of a first plate member. A second plate member may be disposed on a lower side of the first plate member. The first bead may include a front-side portion that extends further to a front side than the second plate member, and a rear-side portion that extends further rearward than the second plate member. The second bead may include a front-side portion that extends further to the front side than the second plate member, and a rear-side portion that extends further rearward than the second plate member. The first fixing portion may be provided on the front-side portion of the first bead. The second fixing portion may be provided on the front-side portion of the second bead. The third fixing portion may be provided on the rear-side portion of the first bead. The fourth fixing portion may be provided on the rear-side portion of the second bead.

According to this configuration, the brace can be appropriately fixed at each fixing portion.

In an example of the electrified vehicle disclosed in the present specification, the brace may further include a lateral bead extending along the vehicle-width direction, at which lateral bead an upper face of the brace protrudes. The vehicle may include a discharge portion that discharges foreign matter that enters a space between the brace and the battery case to outside of the space. A width of a gap between the lateral bead and the battery case may be narrower than a width of the discharge portion.

According to this configuration, the lateral bead can suppress foreign matter (e.g., stones or the like) from entering the space between the brace and the battery case. Also, even when foreign matter does enter the space, the foreign matter can be discharged from the discharging portion.

Figure 2:
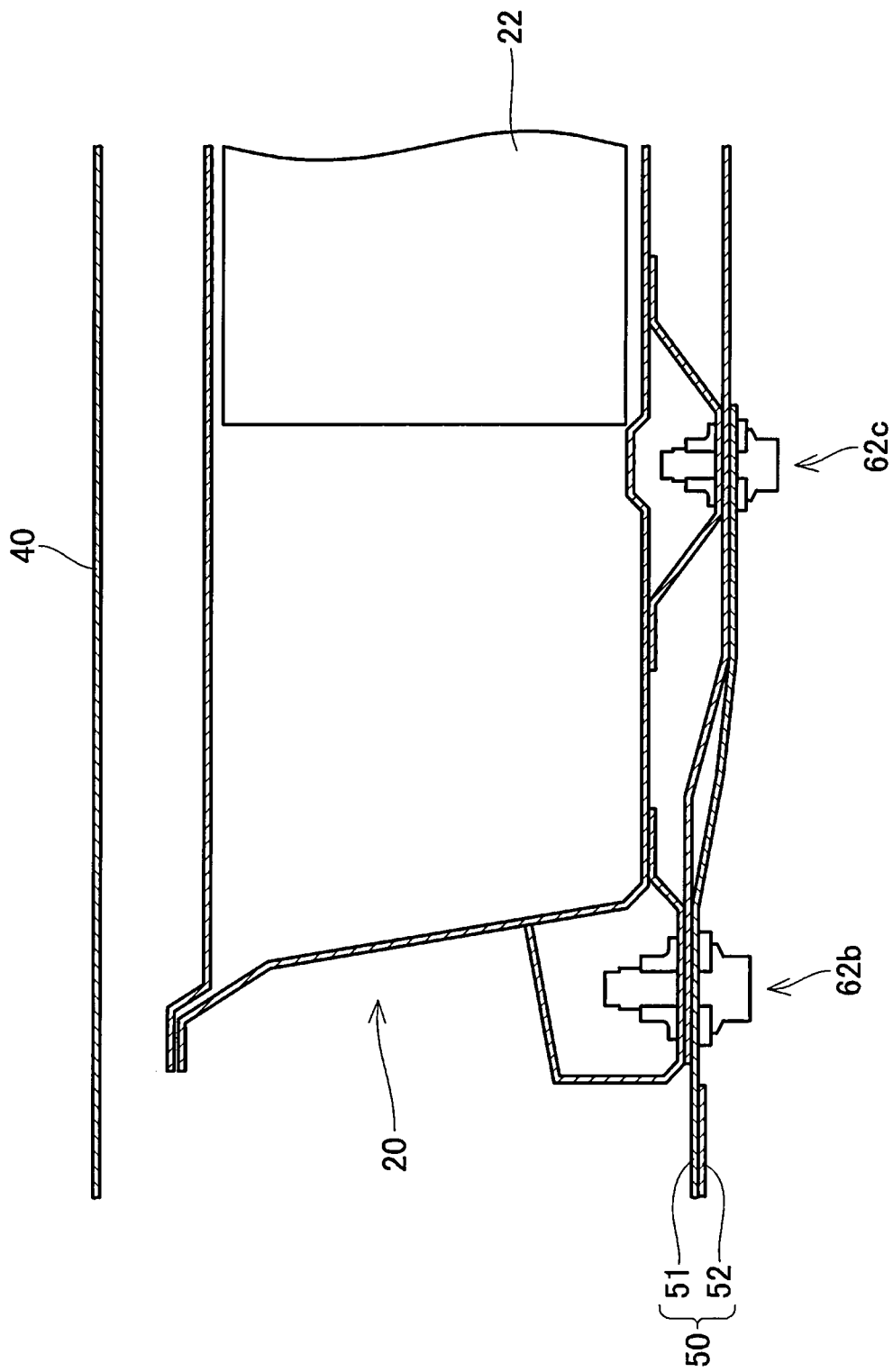
FIG. 2 is a diagram illustrating a section (line II-II in FIG. 4) taken along a front-rear direction of connection portions (positions including attaching holes 62b and 62c) between a battery case 20 and a brace 50.

FIG. 1 illustrates an electrified vehicle 10 according to an embodiment. Note that in the drawings, forward of the vehicle is indicated by arrow FR, upward of the vehicle is indicated by arrow UP, and rightward of the vehicle is indicated by arrow RH. The electrified vehicle 10 has a battery case 20 and a frame 30. As illustrated in FIG. 2, the battery case 20 is disposed on a lower side of a floor panel 40. The floor panel 40 is a plate-shaped member making up a floor of a cabin of the electrified vehicle 10. The battery case 20 accommodates a battery 22. The electrified vehicle 10 has a traction motor, although omitted from illustration. By supplying electric power from the battery 22 to the traction motor, the traction motor is driven and the electrified vehicle 10 travels. As illustrated in FIG. 1, the frame 30 is disposed forward of the battery case 20. The frame 30 is disposed in a front compartment of the electrified vehicle 10. The frame 30 is disposed at substantially the same height as the battery case 20. The frame 30 is fixed to a body of the electrified vehicle 10. A front suspension (omitted from illustration) is connected to the frame 30. The frame 30 supports the front suspension. The frame 30 may be referred to as a "front suspension member".

Figure 3:
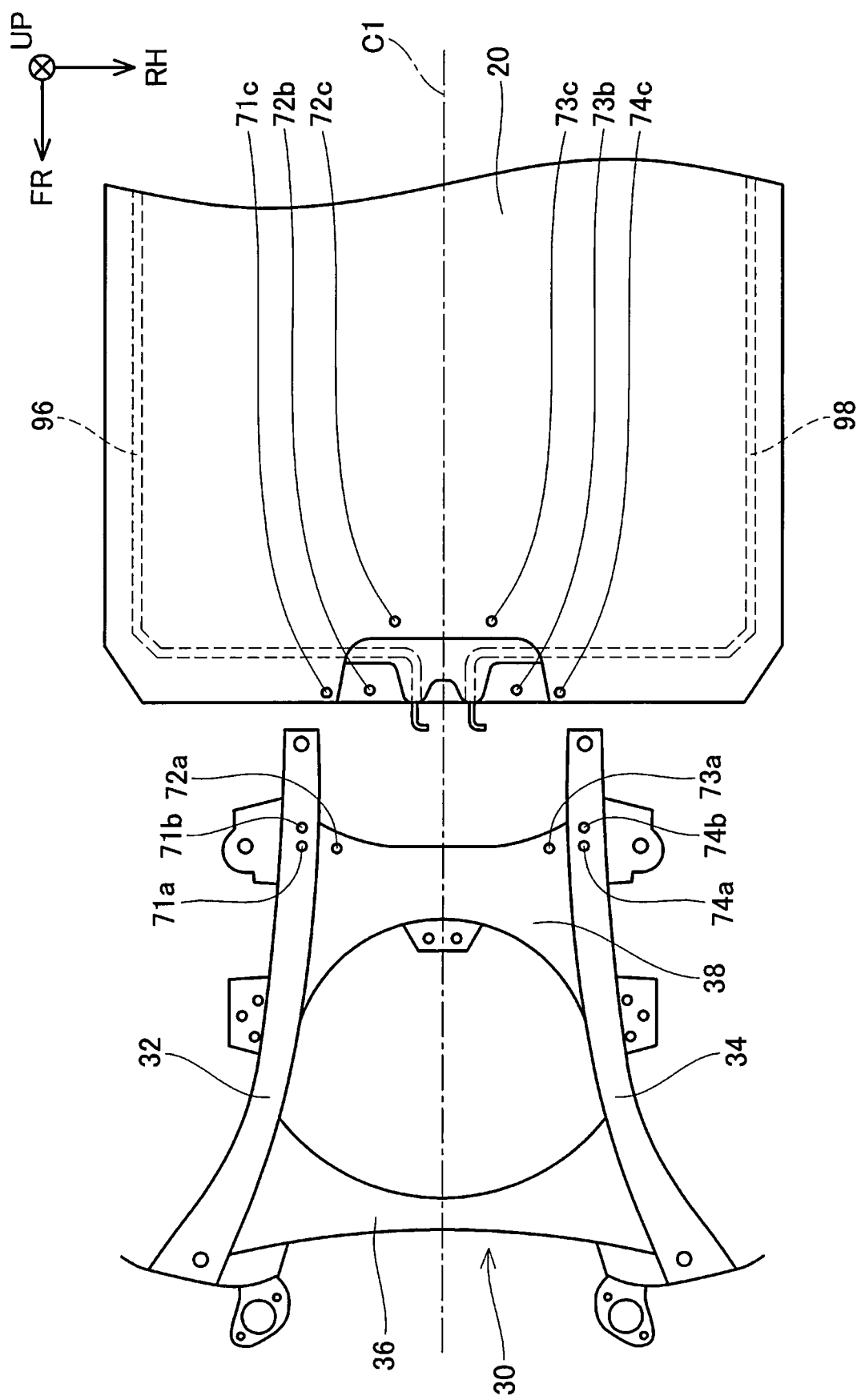
FIG. 3 is a plan view of a frame 30 and the battery case 20 in a state with the brace 50 removed, as viewed from below.

As illustrated in FIG. 3, the frame 30 has two siderails 32 and 34 extending in a front-rear direction, and two cross members 36 and 38 extending in a vehicle-width direction (i.e., a right-left direction of the electrified vehicle 10). The siderails 32 and 34 are disposed across a spacing in the vehicle-width direction. In some of the drawings, including FIG. 3, a long dashed short dashed line indicates the middle C1 of the electrified vehicle 10 in the vehicle-width direction. The siderail 32 is disposed on the left side of the middle C1, and the siderail 34 is disposed on the right side of the middle C1. The cross member 36 connects a front end of the siderail 32 and a front end of the siderail 34. The cross member 38 connects the siderail 32 and the siderail 34 rearward from the cross member 36. The front suspension is attached to the siderails 32 and 34.

Figure 4:
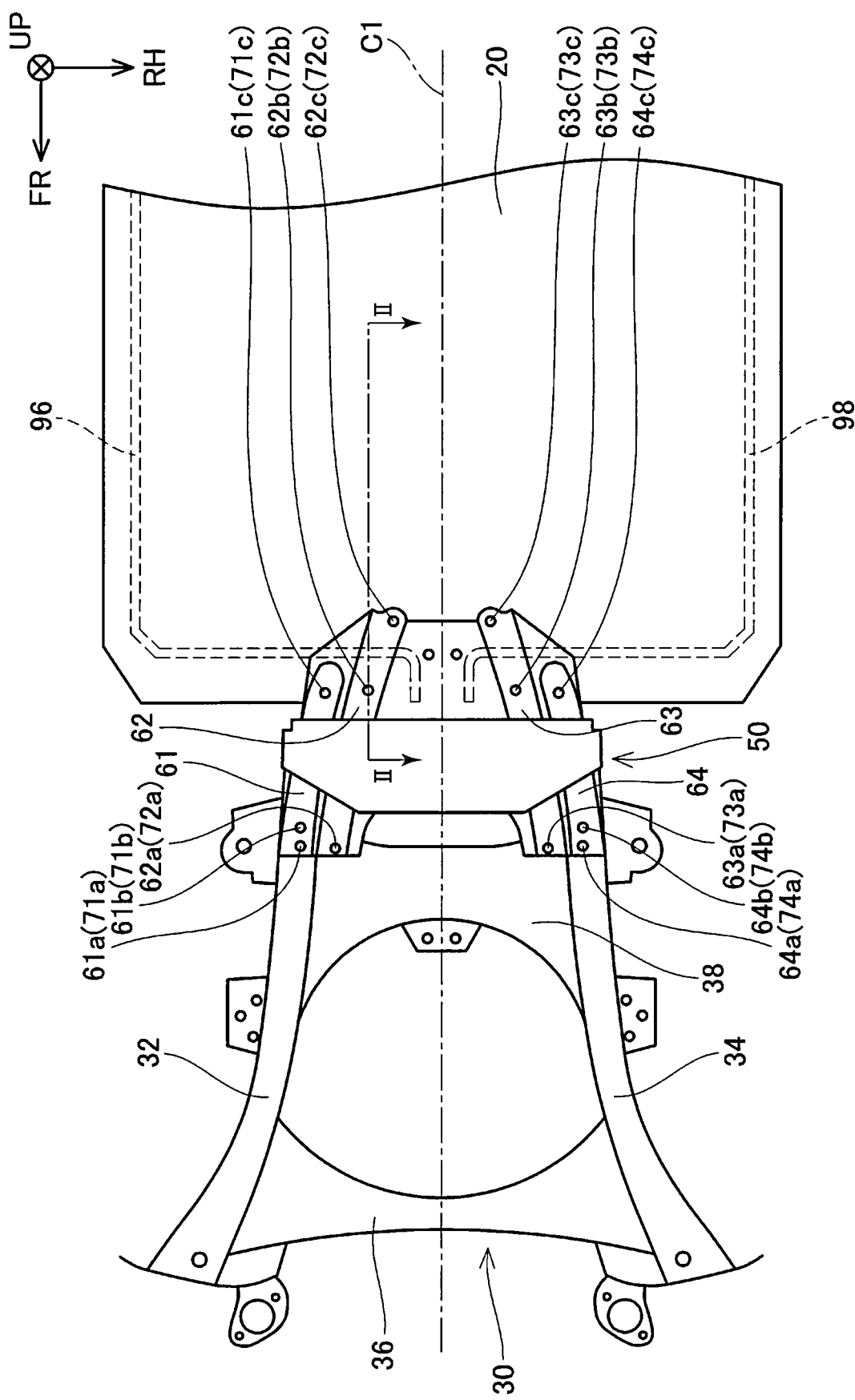
FIG. 4 is a plan view of the frame 30, the battery case 20, and the brace 50, as viewed from below.
Figure 5:
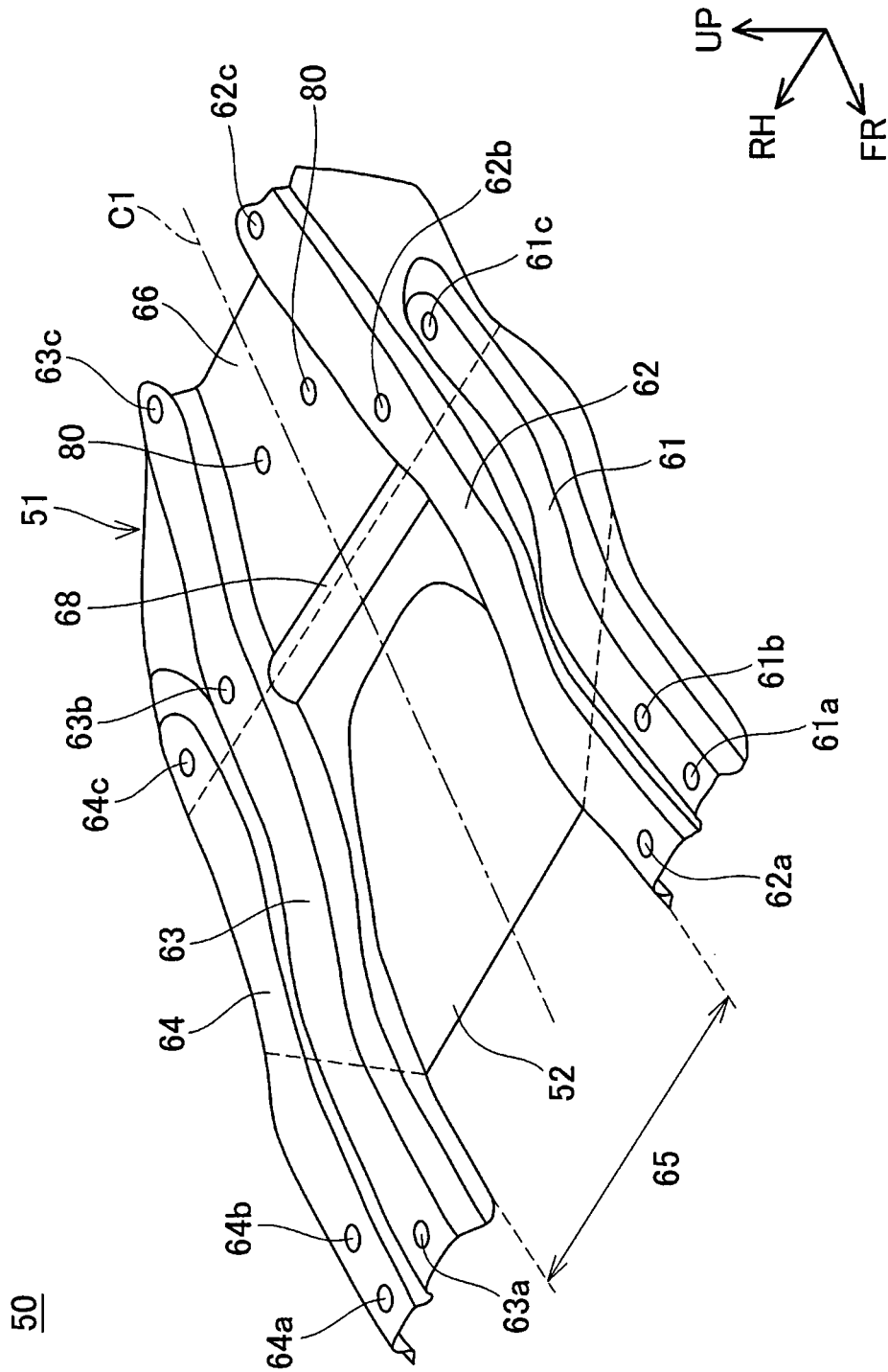
FIG. 5 is a perspective view of the brace 50.
Figure 6:
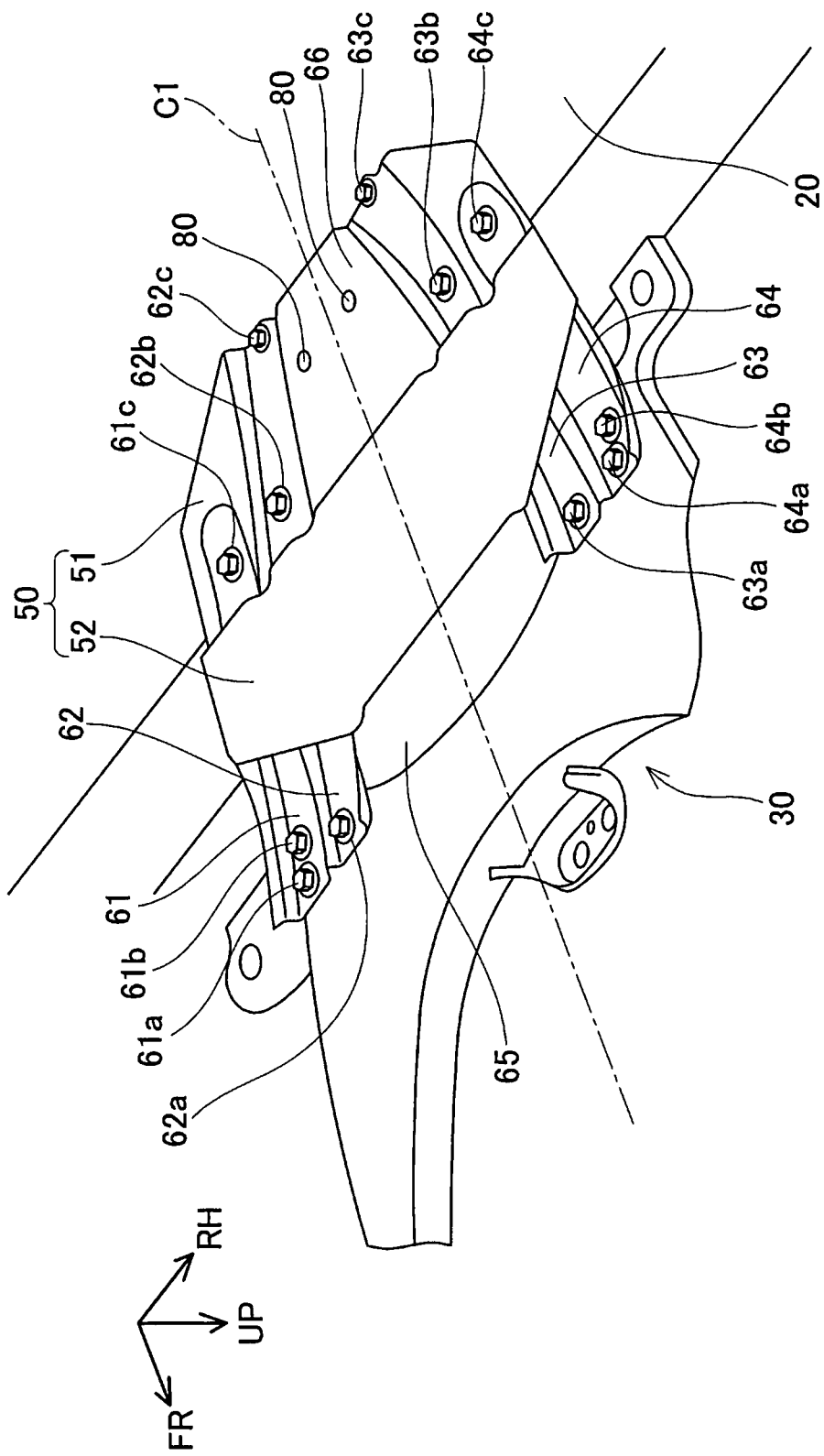
FIG. 6 is a perspective view of the brace 50 connected to the frame 30 and the battery case 20 as viewed from below at an angle.

As illustrated in FIG. 4, the electrified vehicle 10 has a brace 50. The brace 50 connects the frame 30 and the battery case 20. As illustrated in FIGS. 5 and 6, the brace 50 is a plate-shaped member. The brace 50 has a first plate member 51 and a second plate member 52. Each of the first plate member 51 and the second plate member 52 is a metal plate member formed by stamping.

Figure 7:
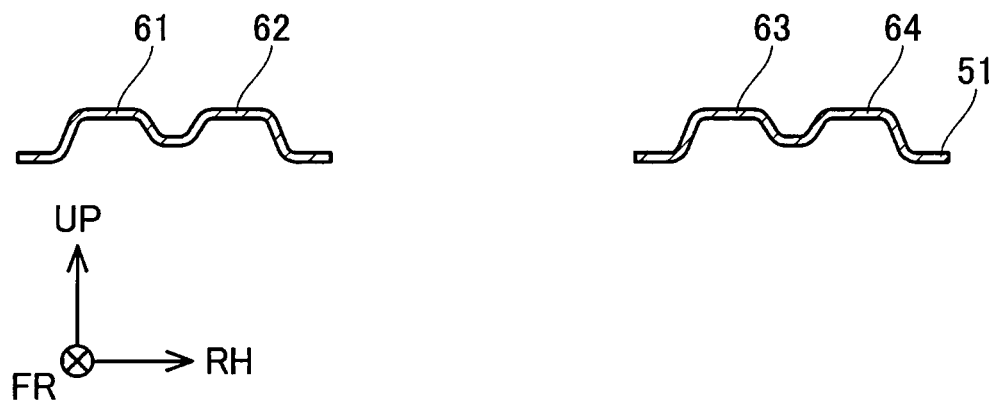
FIG. 7 is a diagram illustrating a section of a first plate member 51, taken along a vehicle-width direction at a position forward of a second plate member 52.

As illustrated in FIG. 5, the first plate member 51 extends across both sides of the middle C1 of the electrified vehicle 10. Four beads 61 to 64 extending along the front-rear direction are formed on the first plate member 51. Each of the beads 61 to 64 is configured of a curved portion of the first plate member 51. As illustrated in FIG. 7, in each range of the beads 61 to 64, a protruding portion is formed on an upper face of the first plate member 51, and a recessed portion is formed on a lower face of the first plate member 51. As illustrated in FIGS. 5 and 6, the beads 61 and 62 are disposed on the left side of the middle C1 of the electrified vehicle 10, and the beads 63 and 64 are disposed on the right side of the middle C1 of the electrified vehicle 10. Attaching holes 61a and 61b are provided at a front end of the bead 61. An attaching hole 61c is provided at a rear end of the bead 61. The bead 61 extends from the attaching holes 61a and 61b to the attaching hole 61c. An attaching hole 62a is provided at a front end of the bead 62. An attaching hole 62c is provided at a rear end of the bead 62. An attaching hole 62b is provided at a position between the attaching hole 62a and the attaching hole 62c in the bead 62. The bead 62 extends from the attaching hole 62a to the attaching hole 62c via the attaching hole 62b. An attaching hole 63a is provided at a front end of the bead 63. An attaching hole 63c is provided at a rear end of the bead 63. An attaching hole 63b is provided at a position between the attaching hole 63a and the attaching hole 63c in the bead 63. The bead 63 extends from the attaching hole 63a to the attaching hole 63c via the attaching hole 63b. Attaching holes 64a and 64b are provided at a front end of the bead 64. An attaching hole 64c is provided at a rear end of the bead 64. The bead 64 extends from the attaching holes 64a and 64b to the attaching hole 64c. At a forward portion of the brace 50, a spaced portion 65 is provided between the bead 62 and the bead 63. Rearward of the spaced portion 65 is provided a plate-shaped portion 66 connecting the bead 62 and the bead 63. A lateral bead 68 extending in the vehicle-width direction is formed on the plate-shaped portion 66. The lateral bead 68 is configured of a curved portion of the plate-shaped portion 66. Within the range of the lateral bead 68, a protruding portion is formed on an upper face of the plate-shaped portion 66, and a recessed portion is formed on a lower face of the plate-shaped portion 66. The lateral bead 68 extends from the bead 62 to the bead 63. Also, two discharge holes 80 are formed in the plate-shaped portion 66. The discharge holes 80 are disposed rearward from the lateral bead 68.

Figure 8:
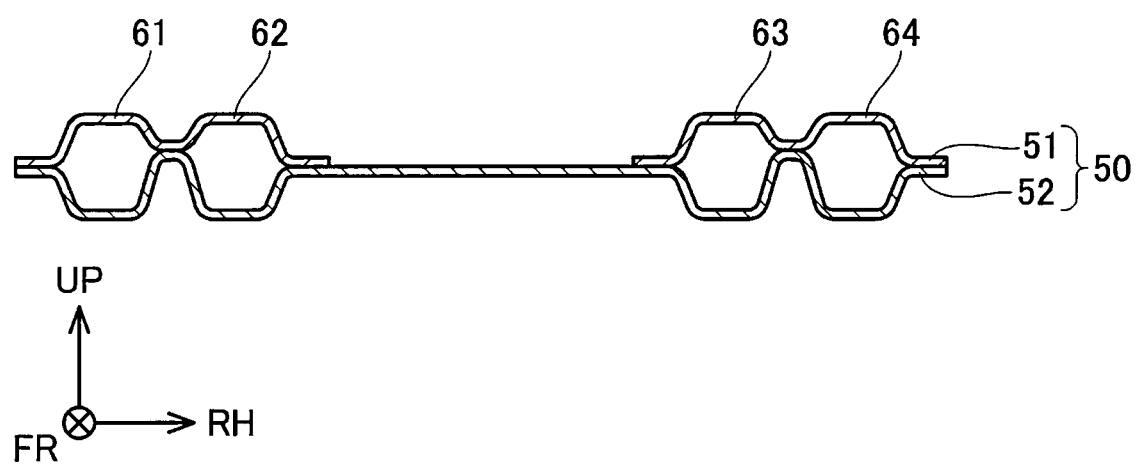
FIG. 8 is a diagram illustrating a section of the brace 50, taken along the vehicle-width direction at a position where the first plate member 51 and the second plate member 52 overlap each other.

As illustrated in FIGS. 5 and 6, the second plate member 52 extends across both sides of the middle C1 of the electrified vehicle 10. The second plate member 52 is disposed below the first plate member 51, and is welded to the first plate member 51. That is to say, the second plate member 52 is fixed to the first plate member 51 in a state in which an upper face of the second plate member 52 is in contact with the lower face of the first plate member 51. The second plate member 52 partially closes off the spaced portion 65 of the first plate member 51. As illustrated in FIG. 8, in a range over which the second plate member 52 covers the lower face of the first plate member 51, the second plate member 52 extends from the bead 61 to the bead 64. The second plate member 52 covers recessed portions (recessed portions formed on the lower face of the first plate member 51) configured by the beads 61 to 64. Each of the beads 61 to 64 and the second plate member 52 configure a tubular portion having a closed cross-section. Each tubular portion extends along the front-rear direction of the electrified vehicle 10. Thus, the strength of the brace 50 is improved by the brace 50 having the tubular portions on both sides of the middle C1, extending along the front-rear direction. As illustrated in FIGS. 5 and 6, the beads 61 to 64 extend further forward beyond the second plate member 52. As illustrated in FIG. 7, at positions forward from the second plate member 52, the recessed portions configured by the beads 61 to 64 are not covered by the second plate member 52. That is to say, at the positions forward from the second plate member 52, the recessed portions configured by the beads 61 to 64 are open. As illustrated in FIGS. 5 and 6, the attaching holes 61a, 61b, 62a, 63a, 64a, and 64b are disposed in portions of the beads 61 to 64 forward from the second plate member 52. The beads 61 to 64 extend further rearward beyond the second plate member 52. At positions rearward from the second plate member 52, the recessed portions configured by the beads 61 to 64 are not covered by the second plate member 52. That is to say, at the positions rearward from the second plate member 52, the recessed portions configured by the beads 61 to 64 are open. The attaching holes 61c, 62b, 62c, 63b, 63c, and 64c are disposed in portions of the beads 61 to 64 rearward from the second plate member 52.

As illustrated in FIG. 3, the siderail 32 is provided with attaching holes 71a and 71b. An attaching hole 72a is provided at a left end of the cross member 38. An attaching hole 73a is provided at a right end of the cross member 38. The siderail 34 is provided with attaching holes 74a and 74b. Attaching holes 71c, 72b, 73b, and 74c are provided at a front end of a lower face of the battery case 20. The attaching holes 71c and 72b are disposed on the left side of the middle C1. The attaching hole 72b is disposed between the attaching hole 71c and the middle C1. The attaching holes 73b and 74c are disposed on the right side of the middle C1. The attaching hole 73b is disposed between the attaching hole 74c and the middle C1. An attaching hole 72c is provided on the lower face of the battery case 20, at a position rearward from the attaching hole 72b. An attaching hole 73c is provided on the lower face of the battery case 20, at a position rearward from the attaching hole 73b.

Figure 9:
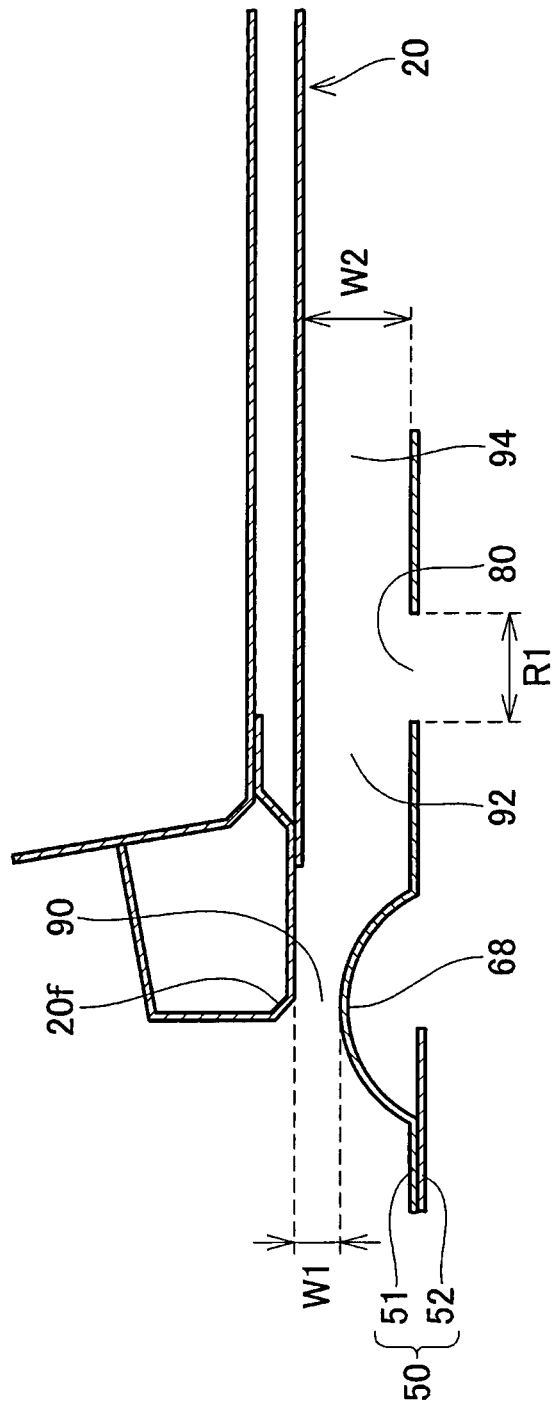
FIG. 9 is a view illustrating a section of a lateral bead 68 and the battery case 20, taken along the front-rear direction.

As illustrated in FIG. 4, the brace 50 is fixed to the frame 30 and the battery case 20. More specifically, the brace 50 is fixed to the attaching holes 71a and 71b of the siderail 32 by bolts and nuts, by the attaching holes 61a and 61b situated on the left side from the middle C1. Also, the brace 50 is fixed to the attaching hole 71c of the battery case 20 by a bolt and a nut, by the attaching hole 61c situated on the left side from the middle C1. The brace 50 is also fixed to the attaching hole 72a of the cross member 38 by a bolt and a nut, by the attaching hole 62a situated on the left side from the middle C1. The brace 50 is also fixed to the attaching hole 72b of the battery case 20 by a bolt and a nut, by the attaching hole 62b situated on the left side from the middle C1. The brace 50 is also fixed to the attaching hole 72c of the battery case 20 by a bolt and a nut, by the attaching hole 62c situated on the left side from the middle C1. The brace 50 is also fixed to the attaching hole 73a of the cross member 38 by a bolt and a nut, by the attaching hole 63a situated on the right side from the middle C1. The brace 50 is also fixed to the attaching hole 73b of the battery case 20 by a bolt and a nut, by the attaching hole 63b situated on the right side from the middle C1. The brace 50 is also fixed to the attaching hole 73c of the battery case 20 by a bolt and a nut, by the attaching hole 63c situated on the right side from the middle C1. Also, the brace 50 is fixed to the attaching holes 74a and 74b of the siderail 34 by bolts and nuts, by the attaching holes 64a and 64b situated on the right side from the middle C1. The brace 50 is also fixed to the attaching hole 74c of the battery case 20 by a bolt and a nut, by the attaching hole 64c situated on the right side from the middle C1. Note that the beads 61 to 64 have shapes that protrude upward, and accordingly the beads 61 to 64 can be in close contact with the frame 30 situated on the upper sides of the beads 61 to 64. Further, the recessed portions configured by the beads 61 to 64 are not covered by the second plate member 52 at the positions of the attaching holes 61a, 61b, 62a, 63a, 64a, and 64b, and accordingly bolting can be suitably performed at the attaching holes 61a, 61b, 62a, 63a, 64a, and 64b. Thus, the brace 50 can be suitably fixed to the frame 30. Also, the beads 61 to 64 have shapes that protrude upward, and accordingly the beads 61 to 64 can be in close contact with the battery case 20 situated on the upper side of the beads 61 to 64. Further, the recessed portions formed by the beads 61 to 64 are not covered by the second plate member 52 at the positions of the attaching holes 61c, 62b, 62c, 63b, 63c, and 64c, and accordingly bolting can be suitably performed at the attaching holes 61c, 62b, 62c, 63b, 63c, and 64c. Accordingly, the brace 50 can be suitably fixed to the battery case 20. Thus, the brace 50 connects the frame 30 and the battery case 20. In a state in which the brace 50 is attached to the battery case 20, the lateral bead 68 is disposed at a position facing a front end 20f of the battery case 20, as illustrated in FIG. 9. The lateral bead 68 extends along the front end 20f of the battery case 20. Further, the discharge holes 80 are disposed on the lower side of the battery case 20.

As illustrated in FIGS. 3 and 4, coolant pipes 96 and 98 for circulating coolant are provided inside the battery case 20. The coolant flows from the coolant pipe 96 to the coolant pipe 98 via a branch flow path (omitted from illustration). The battery 22 in the battery case 20 is cooled by the coolant flowing in this way. When the battery case 20 is viewed from below in plan view, the coolant pipe 96 passes between the attaching hole 62b and the attaching hole 62c, and the coolant pipe 98 passes between the attaching hole 63b and the attaching hole 63c.

When the electrified vehicle 10 encounters a frontal collision, a load is applied to the frame 30. The load applied to the frame 30 travels to the battery case 20 via the brace 50. As described above, the first plate member 51 has the beads 61 to 64 extending in the front-rear direction on both sides of the middle C1, and the second plate member 52 closes off the recessed portions of the beads 61 to 64. Thus, the tubular portions extending in the front-rear direction are formed in the brace 50. Accordingly, the brace 50 has high strength against loads applied from the frame 30, and the loads are readily conveyed from the frame 30 to the battery case 20 via the brace 50. In particular, in the present embodiment, each of the beads 61 to 64 extends from the fixing portions to the frame 30 (i.e., the attaching holes 61a, 61b, 62a, 63a, 64a, 64b) to the fixing portions to the battery case 20 (i.e., the attaching holes 61c, 62b, 62c, 63b, 63c, 64c). Accordingly, the brace 50 has higher strength against the load applied from the frame 30, and the load can be conveyed from the frame 30 to the battery case 20 more effectively via the beads 61 to 64. Conveying the collision load to the battery case 20 in this way reduces the load applied to the body of the electrified vehicle 10.

Further, when the load applied to the brace 50 exceeds a predetermined value, the brace 50 bends at a position between the frame 30 and the battery case 20, as illustrated in FIG. 10. Accordingly, an excessively high load is suppressed from being applied to the battery case 20, and deformation of the battery case 20 is suppressed. In particular, the first plate member 51 of the brace 50 is fixed to the battery case 20 by two attaching holes 62b and 62c disposed on the left side of the middle C1 with spacing therebetween in the front-rear direction, and the attaching holes 62b and 62c are connected through the bead 62. Also, the first plate member 51 of the brace 50 is fixed to the battery case 20 by two attaching holes 63b and 63c disposed on the right side of the middle C1 with spacing therebetween in the front-rear direction, and the attaching holes 63b and 63c are connected through the bead 63. This structure reinforces the front-side portion of the battery case 20 (i.e., the portion between the attaching holes 62b and 63b and the attaching holes 62c and 63c). Thus, deformation of the battery case 20 is suppressed more effectively, as illustrated in FIG. 10. Also, as illustrated in FIG. 4, the coolant pipe 96 passes between the attaching hole 62b and the attaching hole 62c. That is to say, the coolant pipe 96 is disposed in the region of the battery case 20 reinforced by the brace 50. Also, the coolant pipe 98 passes between the attaching hole 63b and the attaching hole 63c. That is to say, the coolant pipe 98 is disposed in the region of the battery case 20 reinforced by the brace 50. Accordingly, the coolant pipes 96 and 98 are less readily damaged in a collision of the electrified vehicle 10.

Further, the brace 50 is a plate-shaped member in which the first plate member 51 and the second plate member 52 are joined together, and the brace 50 is fixed to the frame 30 and the battery case 20 on both sides of the middle C1, and accordingly the brace 50 can effectively convey the collision load to the battery case 20 even in the event of the electrified vehicle 10 encountering a collision on one side (e.g., the right or left side) from ahead. For example, when the electrified vehicle 10 encounters a collision at the forward right side, a load is applied from the siderail 34 of the frame 30 to the right side portion of the battery case 20 (i.e., the portion to the right side of the middle C1) via the beads 63 and 64 of the brace 50. Also, the beads 63 and 64 are connected to the beads 61 and 62 by the plate-shaped portion 66 of the first plate member 51 and the second plate member 52. Accordingly, the load is readily applied from the beads 63 and 64 to the beads 61 and 62. The load applied to the beads 61 and 62 is conveyed to the left side portion of the battery case 20 (i.e., the portion on the left side of the middle C1). Thus, even when the electrified vehicle 10 encounters a collision at the forward right side, the load can be effectively conveyed to the right side portion and the left side portion of the battery case 20 by the brace 50. Also, when the electrified vehicle 10 encounters a collision at the forward left side, the load can be effectively conveyed to the right side portion and the left side portion of the battery case 20 by the brace 50 in the same way. Therefore, the load applied to the body of the electrified vehicle 10 is reduced even when the collision is on one side of the vehicle.

Also, as illustrated in FIG. 9, the brace 50 is provided with the lateral bead 68, and accordingly a width W1 of a gap 90 between the lateral bead 68 and the battery case 20 is narrowed. This suppresses foreign matter (e.g., stones or the like) from entering a space 92 between the brace 50 and the battery case 20 when the electrified vehicle 10 is traveling. Also, the first plate member 51 of the brace 50 is provided with the discharge holes 80. A diameter R1 of the discharge holes 80 is larger than the width W1 of the gap 90. Accordingly, even when foreign matter does enter the space 92 through the gap 90, the foreign matter can be discharged downward through the discharge holes 80. Further, a width W2 of a gap 94 between the rear end of the brace 50 and the battery case 20 is wider than the width W1 of the gap 90. Accordingly, even when foreign matter does enter the space 92 through the gap 90, the foreign matter can be discharged rearward from the gap 94. Thus, in the electrified vehicle 10 according to the embodiment, the lateral bead 68 suppresses entry of foreign matter into the space 92 between the brace 50 and the battery case 20, and even when the foreign matter does enter the space 92, the foreign matter can be externally discharged from the space 92 through the discharge holes 80 and the gap 94.

Also, in the electrified vehicle 10, the brace 50 is fixed to the frame 30 and the battery case 20 by bolting. Accordingly, the brace 50 can be removed from the frame 30 and the battery case 20 at the time of maintenance. Thus, the ease of maintenance of the frame 30 and the battery case 20 is high. For example, the battery case 20 can be replaced when the capacity of the battery 22 decreases due to deterioration over time.

In the electrified vehicle according to the above-described embodiment, the first plate member is provided with beads that protrude upward, and the second plate member covers the recessed portion on the lower face of the first plate member (i.e., the bead). Alternatively, the first plate member may be provided with beads that are recessed downward, and the second plate member may cover the recessed portion on the upper face of the first plate member (that is, the bead).

Further, while the battery case and the frame disposed on the front side of the battery case (that is, the frame supporting the front suspension) are connected by the brace in the electrified vehicle according to the above-described embodiment, the battery case and a frame disposed on the rear side of the battery case (i.e., a frame supporting a rear suspension) may be connected by a brace. The technology disclosed in the present specification can be applied in this case as well.

The attaching holes 63a, 64a, and 64b according to the embodiment are an example of a first fixing portion. The attaching holes 61a, 61b, and 62a according to the embodiment are an example of a second fixing portion. The attaching holes 63b and 64c according to the embodiment are an example of a third fixing portion. The attaching holes 61c and 62b according to the embodiment are an example of a fourth fixing portion. The attaching hole 63c according to the embodiment is an example of a fifth fixing portion. The attaching hole 62c according to the embodiment is an example of a sixth fixing portion. The beads 63 and 64 according to the embodiment are an example of a first bead. The beads 61 and 62 according to the embodiment are an example of a second bead. The bolts fastened to the attaching holes 63a, 64a, and 64b according to the embodiment are an example of a first bolt. The bolts fastened to the attaching holes 61a, 61b, and 62a according to the embodiment are an example of a second bolt. The bolts fastened to the attaching holes 63b and 64c according to the embodiment are an example of a third bolt. The bolts fastened to the attaching holes 61c and 62b according to the embodiment are an example of a fourth bolt.

Although an embodiment is described in detail above, this is merely exemplary and is not intended to limit the scope of the claims. The technology described in the claims includes various modifications and alterations of the specific examples exemplified above. The technical elements described in the present specification and the drawings exhibit technical utility alone or in various combinations, and are not limited to the combinations described in the claims at the time of filing. Also, the technology exemplified in the present specification and the drawings achieve a plurality of objects at the same time, and achieving one of the objects itself has technological utility.

What is claimed is:

1. An electrified vehicle, comprising:
a floor panel;
a battery case that is disposed on a lower side of the floor panel, and that accommodates a battery;
a frame that is disposed in a vehicle forward side or a vehicle rearward side of the battery case and that supports a suspension; and
a brace that intersects an imaginary middle line orthogonal to a vehicle-width direction of the electrified vehicle, and that is fixed to the frame and the battery case, wherein:
the brace is fixed to the frame by a first fixing portion situated on a right side of the electrified vehicle with respect to the middle line;
the brace is fixed to the frame by a second fixing portion situated on a left side of the electrified vehicle with respect to the middle line;
the brace is fixed to the battery case by a third fixing portion situated on the right side of the electrified vehicle with respect to the middle line;
the brace is fixed to the battery case by a fourth fixing portion situated on the left side of the electrified vehicle with respect to the middle line;
the brace includes a first plate member and a second plate member;
the first plate member includes a first bead that is situated on the right side of the electrified vehicle with respect to the middle line and that extends in a front-rear direction, and a second bead that is located on the left side of the electrified vehicle with respect to the middle line and that extends in the front-rear direction; and
the second plate member is fixed to the first plate member, being stacked with the first plate member, and covers a first recessed portion configured of the first bead on a surface of the first plate member and a second recessed portion configured of the second bead on the surface of the first plate member.

2. The electrified vehicle according to claim 1, further comprising:
a first bolt that fixes the brace to the frame at the first fixing portion;
a second bolt that fixes the brace to the frame at the second fixing portion;
a third bolt that fixes the brace to the battery case at the third fixing portion; and
a fourth bolt that fixes the brace to the battery case at the fourth fixing portion.

3. The electrified vehicle according to claim 1, wherein:
the brace is fixed to the battery case at a fifth fixing portion situated on the right side of the electrified vehicle with respect to the middle line and situated on the vehicle rearward side with respect to the third fixing portion; and the brace is fixed to the battery case at a sixth fixing portion situated on the left side of the electrified vehicle with respect to the middle line and situated on the vehicle rearward side with respect to the fourth fixing portion.

4. The electrified vehicle according to claim 3, wherein:
a coolant pipe that extends at least partly in the vehicle-width direction is provided within the battery case; and
the coolant pipe is disposed in at least one of between the third fixing portion and the fifth fixing portion and between the fourth fixing portion and the sixth fixing portion, in plan view of the battery case from below.

5. The electrified vehicle according to claim 1, wherein:
the first bead extends from the first fixing portion to the third fixing portion; and
the second bead extends from the second fixing portion to the fourth fixing portion.

6. The electrified vehicle according to claim 5, wherein:
the first recessed portion and the second recessed portion are provided on a lower face of the first plate member;
the second plate member is disposed on a lower side of the first plate member;
the first bead includes a first front-side portion that extends further toward the vehicle forward side than the second plate member, and a first rear-side portion that extends further toward the vehicle rearward side than the second plate member;
the second bead includes a second front-side portion that extends further toward the vehicle forward side than the second plate member, and a second rear-side portion that extends further toward the vehicle rearward side than the second plate member;
the first fixing portion is provided on the first front-side portion of the first bead;
the second fixing portion is provided on the second front-side portion of the second bead;
the third fixing portion is provided on the first rear-side portion of the first bead; and
the fourth fixing portion is provided on the second rear-side portion of the second bead.

7. The electrified vehicle according to claim 1, wherein:
the brace further includes a lateral bead extending along the vehicle-width direction, an upper face of the brace protruding at the lateral bead;
the electrified vehicle includes a discharge portion that discharges foreign matter that enters a space between the brace and the battery case to outside of the space; and
a width of a gap between the lateral bead and the battery case is narrower than a width of the discharge portion.

* * * * *